N. LITTLE.
NUT LOCK.
APPLICATION FILED MAY 4, 1910.
975,545.
Patented Nov. 15, 1910.
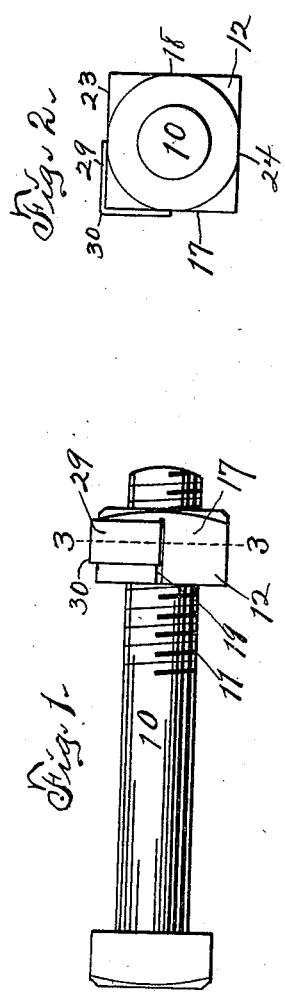
Attest:
H. G. Sweet.
N. W. Winters.
Inventor:
Nathaniel Little,
By J. C. Sweet, Atty

UNITED STATES PATENT OFFICE.

NATHANIEL LITTLE, OF DES MOINES, IOWA.

NUT-LOCK.

975,545.  Specification of Letters Patent.  Patented Nov. 15, 1910.

Application filed May 4, 1910. Serial No. 559,843.

*To all whom it may concern:*

Be it known that I, NATHANIEL LITTLE, a citizen of the United States of America, and resident of Des Moines, Polk county, Iowa, have invented a new and useful Nut-Lock, of which the following is a specification.

The object of this invention is to provide an improved construction for nut-locks.

My invention consists in the construction, arrangement and combination of elements hereinafter set forth, pointed out in my claims and illustrated by the accompanying drawing, in which—

Figure 1 is a side elevation of a bolt and nut showing my improved device applied thereto. Fig. 2 is an end elevation of the same. Fig. 3 is a cross-section on the indicated line 3—3 of Fig. 1, on an enlarged scale. Fig. 4 is a cross-section similar to Fig. 3 showing a modified construction of part of the device. Fig. 5 is a detail side elevation of a locking pin shown in Fig. 4, on a further enlarged scale.

In the construction of the device as shown the numeral 10 designates a bolt of ordinary construction with a thread 11 on one end portion. A nut 12, preferably square in cross-section, is adapted to be screwed on the threaded portion of the bolt 10. Alining holes or passages 13, 14 are formed in and diagonally of the nut 12 and intersect the threaded bore of said nut. The holes or passages 13, 14 open to diagonally opposite corners of the nut 12 and notches 15, 16 are formed in faces 17, 18 of said nut and communicate with outer end portions of said holes or passages. The nut 12 also is formed with transverse notches or grooves 19, 20, 21, 22 centrally of its faces 17, 18, 23, 24, each of which notches is dove-tailed or cut under on the side thereof nearest to the holes or passages 13, 14. The notches or transverse grooves 19, 20, 21, 22 do not extend entirely across the faces of the nut 12 but stop short of the outer end of said nut as illustrated in Figs. 1 and 2. A locking pin 25 is adapted to be mounted in one or the other of the holes or passages 13, 14. The locking pin 25 is formed with a transverse edge 26 centrally of one end. That is to say, one end portion of the pin 25 is beveled on opposite sides to form a centrally located transverse edge 26. The pin 25 also is beveled on opposite sides at its end opposite to the edge 26 and is formed with a flattened end or plateau 27 intermediate of its beveled faces. This construction shapes one end of the pin flush with the sides of the nut and avoids battering said end in driving the pin to a seat in the threaded surface of the bolt. The pin 25 also is formed with a lip or projection 28 extending laterally from its outer end portion and adapted to lie in one or another of the notches 15, 16. The pin 25 preferably is made entirely of hardened steel. An angular spring 29 is provided and preferably is shaped to fit one corner of the nut 12. The spring 29 preferably is flat in cross-section and has a right-angled bend 30 at its center. The spring 29 is preferably of considerably less width than either face of the nut 12 and is formed with end flanges 31, 32 adapted to engage in notches 19, 21 or 20, 22. The end flanges 31, 32 of the spring 29 preferably are turned inwardly or hook-shaped to take in and rigidly engage the dove-tailed faces of the notches 19, 21 or 20, 22 in the nut.

In practical use of this device, the nut constructed as shown is screwed on the bolt 10 to the desired extent. Then a locking pin 25 is mounted in one or the other of the holes 13, 14 and is arranged with its lip 28 in line with the proper notch 15, or 16. Then the pin 25 is driven by blows of a hammer or sledge into the thread of the bolt 10 so that the transverse centrally arranged edge 26 of said pin will cut, sever and be seated in and transversely of said thread. The pin 25 is sunk to such extent that the lip 28 thereon seats in a notch 15 or 16 and the outer beveled faces of said pin are flush with faces of the nut. When the pin is so seated the inner beveled face of the lip 28 is spaced from the bottom wall of the notch 15 or 16. This is for the purpose of permitting a tool, such as a chisel, to be introduced between the lip 28 and bottom of the notch 15 or 16 for the purpose of prying or driving the pin 25 out of the hole 13 or 14 when it is desired to readjust, remove or tighten the nut 12. After the pin 25 has been seated as shown and described the spring 29 is mounted on the nut 12 in such manner as to overlie and cover the outer end portion of said pin. This operation preferably is performed by engaging one hook flange of the spring 29 in one of the notches 19, 20, 21 or 22 and then driving said spring to place by quick blows of a hammer or sledge properly applied to the central portion of the spring, in order that the opposite hook flange of said spring may be sprung into and engage the mating notch of the set in the central portions of the faces of the nut. When the spring has been placed in position as shown it engages by its inner faces adjacent its angular bend 30 with the outer beveled faces of the pin 25 and effectually holds said pin to its seat. At the same time the lip 28 engages in the notch 15 or 16 and prevents rotary movement of the pin in its seat. It will be observed that the direction of the engagement of the pin 25 with the bolt 10 is diametrically of said bolt, thus providing for an equal exercise of retaining influence against rotation of the nut in either direction relative to and on the bolt. This construction permits a locking of the nut on the bolt in either tight or loose relation of the nut and bolt relative to the objects connected thereby. When it is desired to remove the locking pin for the purpose of removing or readjusting the nut 12 relative to the bolt, the spring 29 is first removed by introducing a chisel or wedge between one end portion of said spring and the adjacent face of the nut and prying said end portion of the spring away from the nut sufficiently to release the adjacent hook flange from its seat in a notch of the nut. By making the notches 19, 20, 21, 22 of less length than the width of the nut provision is made for preventing the spring 29 being jarred or jostled from the nut and by making said notches of greater length than the width of the spring provision is made for utilizing springs varying somewhat in width and without necessitating exact fitting of one to the other.

In Figs. 4 and 5 I show a locking pin $25^a$ formed with a transverse notch or recess $25^b$ in its head. In this construction I prefer to employ a spring $29^a$ circular in cross-section and adapted to seat at its central portion in the notch $25^b$ of the pin $25^a$. The construction of the nut is not altered nor is the pin changed other than in respect of the notch $25^b$. In this construction the notch $25^b$ tends to retain the spring $29^a$ in proper position in respect of lateral movement of the center of said spring.

I claim as my invention—

A nut-lock, comprising a nut formed with alining passages intersecting the bore of the nut and also formed with notches in some of its faces intersecting the passages, a locking pin adapted to be seated in one of said passages, said locking pin formed with a central transverse edge on one end adapted to bite the thread of a bolt on which the nut is used, said locking pin also formed with a lateral lip adapted to enter and be spaced from the bottom of one of the notches in the nut, the outer end portion of said pin formed with oppositely inclined faces separated by a flattened face or plateau, said oppositely inclined faces at right angles to each other and adapted to be arranged flush with the faces of the nut, the nut also formed with notches centrally and transversely of its faces and of less length than the width of the nut and open at one end thereof, which notches are cut under on one side, and a spring bent angularly at its center and formed with hooks on its ends adapted to engage in pairs of said notches.

Signed by me at Des Moines, Iowa, this 15th day of February, 1910.

NATHANIEL LITTLE.

Witnesses:
S. C. SWEET,
EARL M. SINCLAIR.